Figure 1:
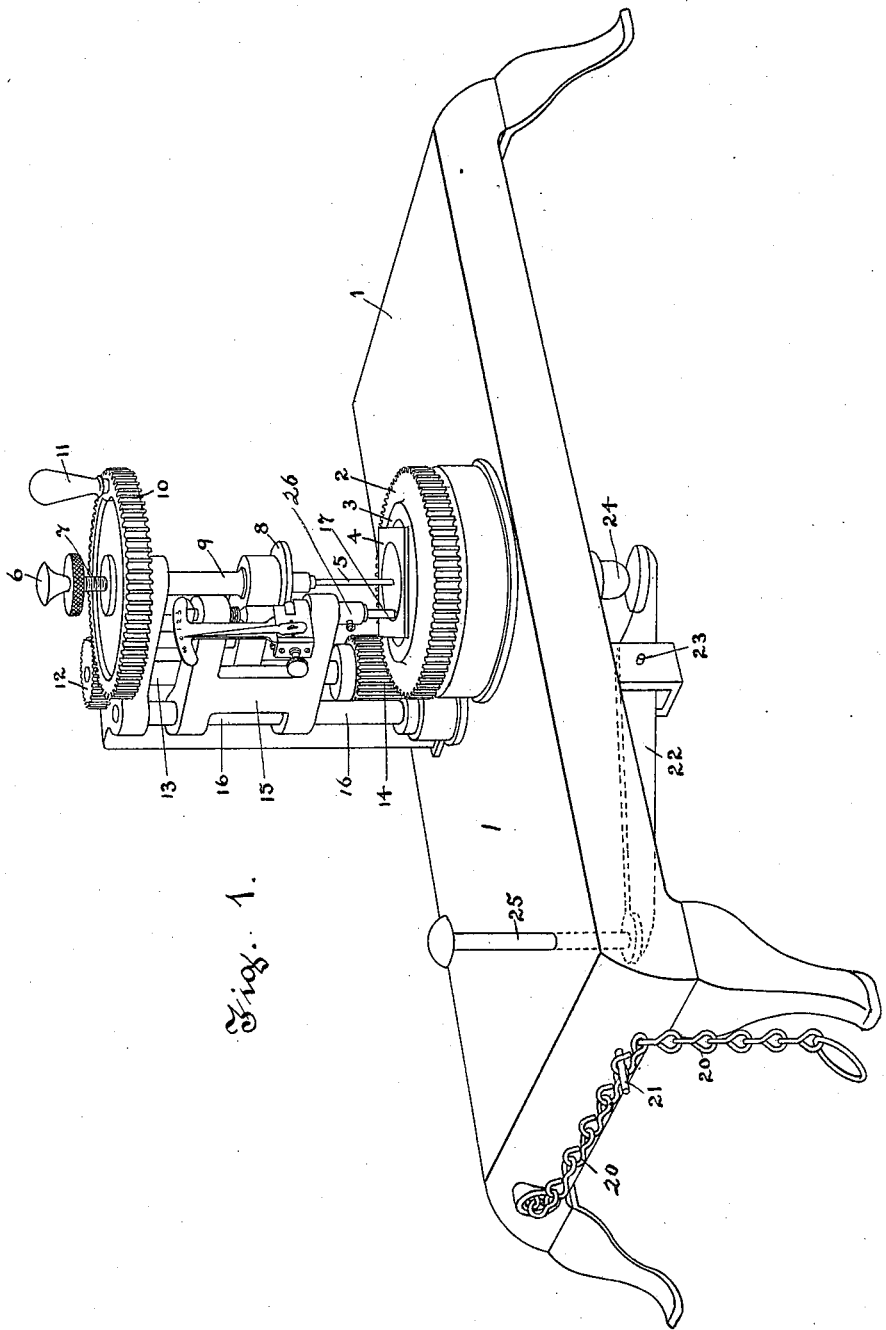

(No Model.)  F. G. BLANCHARD.  2 Sheets—Sheet 1.
LENS CUTTING MACHINE.

No. 602,207.  Patented Apr. 12, 1898.

Witnesses
A. C. Whiting
M. J. Galvin

Inventor
Frederick G. Blanchard
By his Attorney
John C. Dewey.

(No Model.) 2 Sheets—Sheet 2.
F. G. BLANCHARD.
LENS CUTTING MACHINE.
No. 602,207. Patented Apr. 12, 1898.
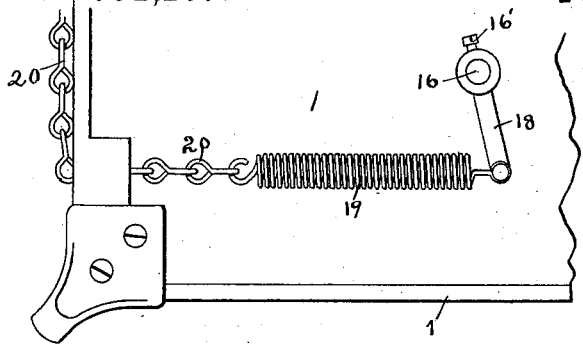
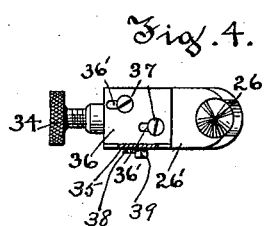
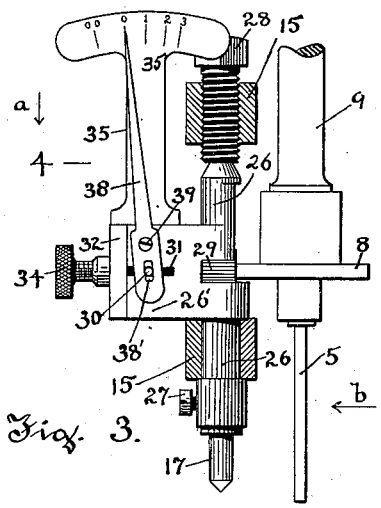
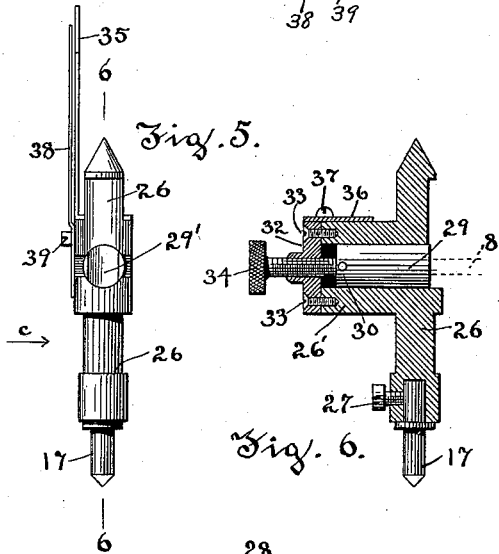
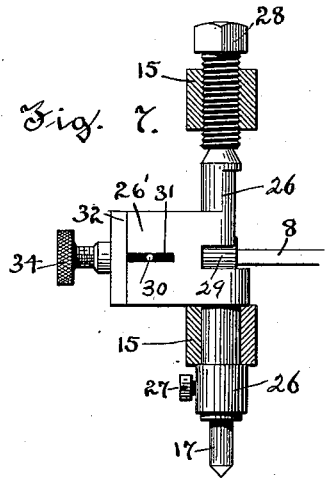
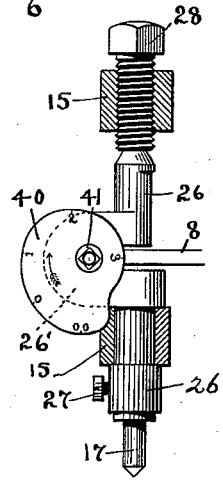
Witnesses
A. W. Whiting
M. J. Galvin
Inventor
Frederick G. Blanchard
By his Attorney
John C. Dewey.

UNITED STATES PATENT OFFICE.

FREDERICK G. BLANCHARD, OF SOUTHBRIDGE, MASSACHUSETTS, ASSIGNOR TO THE AMERICAN OPTICAL COMPANY, OF SAME PLACE.

LENS-CUTTING MACHINE.

SPECIFICATION forming part of Letters Patent No. 602,207, dated April 12, 1898.

Application filed November 21, 1896. Serial No. 612,950. (No model.)

*To all whom it may concern:*

Be it known that I, FREDERICK G. BLANCHARD, a citizen of the United States, residing at Southbridge, in the county of Worcester and State of Massachusetts, have invented certain new and useful Improvements in Lens-Cutting Machines, of which the following is a specification.

My invention relates to a lens-cutting machine or a machine for cutting spherical and cylinder lenses of different sizes for spectacles and eyeglasses; and the object of my invention is to improve upon this class of machines as now ordinarily made, and more particularly the adjustment of the diamond-holder, so that the same pattern may be used for different sizes of lenses.

Heretofore in this class of lens-cutting machines to which my invention relates it has been customary, when it was desired to cut lenses of different sizes from the same pattern, to adjust in a horizontal plane the bed-gear carrying the pad on which the lens is held. In doing this the center of the lens is moved out of center with the center tension-rod, so that as the lens is revolved in the operation of cutting the center of the lens and the center of the center tension-rod do not coincide, and there is consequently a marking or a scratching of the lens at its central part by the center tension-rod. In my improved construction of the machine I do away with any horizontal adjustment of the bed-gear, so that the center of the lens to be cut will always coincide or be in permanent axial alinement with the center of the center tension-rod, and there will consequently be no marking or scratching of the lens by the center tension-rod, and I provide an adjustable surface on the diamond-holder frame which bears against the edge of the pattern, and by adjusting this surface to bring the diamond-holder nearer or farther from the center of the lens and the center tension-rod the same pattern can be used for all sizes of lenses.

My invention consists in certain novel features of construction of the diamond-holder frame to adjust the position of the diamond-holder relatively to the center of the lens, as will be hereinafter fully described.

Referring to the drawings, Figure 1 is a perspective view of a lens-cutting machine of well-known construction and operation with my improvements applied thereto. Fig. 2 is a bottom view of a portion of the machine shown at the left in Fig. 1 to show the tension-chain for the diamond-holder frame. Fig. 3 is, on an enlarged scale, a front view of my improvements applied to the diamond-holder frame, the front end of which is shown in section. The center tension-rod, the pattern, and the arbor on which the pattern is secured are also shown. Fig. 4 is a cross-section on line 4 4, Fig. 3, looking in the direction of arrow $a$, same figure. Fig. 5 is a side view of the parts shown at the left in Fig. 3, looking in the direction of arrow $b$, same figure. The center tension-rod, pattern, and arbor are not shown in this figure. Fig. 6 is a section on line 6 6, Fig. 5, looking in the direction of arrow $c$, same figure. Fig. 7 is a modified construction of the parts shown at the left in Fig. 3, the pointer and scale being left off; and Fig. 8 shows a modified construction of the adjustable surface engaging the pattern shown in Fig. 7.

It will be understood that all of the parts of the machine shown in the drawings except the diamond-holder frame are of old and well-known construction and form no part of my invention, which, as before stated, relates to the adjustment of the diamond-holder relatively to the center of the lens.

In the accompanying drawings, 1 is the stand or frame of the machine, on which are supported the several parts thereof. 2 is the bed-gear, provided with a pad 3, upon which the lens 4 to be cut is placed. 5 is the center tension-rod, the lower end or point of which presses on the center point of the lens and holds it on the pad. 6 is a knob secured on the top of the center tension-rod 5, by which said rod may be raised, if desired. 7 is a screw which regulates the tension or pressure of the rod 5 on the lens. 8 is the lens pattern, secured on the arbor 9. 10 is a gear secured on the upper end of said arbor 9, and 11 a handle for turning said gear. The gear 10 meshes with a pinion 12 on an upright shaft 13, carrying at its lower end a pinion 14, which meshes with and turns the bed-gear 2. By this construction the center of the bed-gear is always in permanent axial alinement with the center of the tension-rod 5, and as the bed-gear, the lens being cut, and the tension-rod rotate on the same axis and synchronously or in unison with each other the possibility of the tension-rod scratching the face of the lens is avoided.

15 is the swinging diamond-holder frame, fast on a vertical shaft 16 and carrying the diamond-holder 17. On the lower end of the shaft 16 is secured by set-screw 16' an arm 18, to the outer end of which is attached a spiral spring 19. The other end of said spring is attached to the end of a chain 20, which passes through an opening in the end of the frame 1 (see Fig. 1) and is adapted to engage with one of its links a pin 21, extending out from the end of the frame 1 to move the diamond-holder frame inward and hold it against the pattern.

22 is a lever pivoted at 23 under the frame 1 and adapted to engage at one end the lower end of the central rod or support 24 of the bed-gear 2 to raise said bed-gear and bring the lens supported thereon up to the diamond in the diamond-holder 17. The lever 22 is adapted to be engaged at its other end by a push-pin 25, extending through an opening in the frame 1 and above the opening, as shown. The pushing in of the pin 25 through lever 22 raises the bed-gear 2 in the usual way.

All of the above parts are of the ordinary construction and operation in the class of machines to which my invention relates, except that the bed-gear 2 is in permanent alinement with the tension-rod and not made adjustable horizontally, as heretofore.

I will now proceed to describe my improvements, which, as above stated, consist in combining with the diamond-holder frame an adjustable surface to engage the edge of the lens pattern.

The diamond-holder 17 is removably secured in the lower end of the jaw 26 by a screw 27. The jaw 26 is supported in the outer end of the swinging frame 15, and in this instance a bolt 28 extends through a threaded hole in the upper arm of the frame and receives in a tapering recess in its lower end the upper tapering end of the jaw 26. The jaw 26 has a side extension or sleeve 26', which has a horizontal opening therethrough to receive an adjustable surface or pin 29, the inner end 29' of which is preferably grooved, as shown in Fig. 5, to conform to the edge of the pattern 8.

The adjustable pin 29 is provided with a pin 30, which extends through a slot 31 in the side extension 26' and prevents the pin 29 from turning. The pin 29 is inserted through the outer open end of the extension 26', with the pin 30 extending in the slot 31. A plate 32 is then secured by screws 33 or otherwise to the end of the side extension 26'. Said plate 32 has a central screw-threaded hole therein, into which an adjusting-screw 34 is screwed. The inner end of the screw 34 bears against the outer end of the adjusting-pin 29. (See Fig. 6.) By turning said screw in or out the adjusting-pin 29 is moved in or out to move the frame 15 and bring the diamond-holder 17 toward or away from the center tension-rod 5 and the center of the lens, the tension-chain 20 holding the end of the adjustable surface 29 in engagement with the edge of the pattern 8.

In order to regulate the adjustment of the adjustable surface 29 for different sizes of lenses, I may provide a scale 35, which in this instance is provided with a base-plate 36, secured upon the top of the side extension 26' by means of screws 37, extending through slots 36' in the plate 36.

A pointer 38 is pivoted by a screw 39 on the front side of the sleeve 26' and has a slot 38' in its lower end, into which extends the pin 30 on the adjustable pin 29.

It will be seen that the movement of the adjustable pin 29 in or out will move the pointer 35 to indicate the marks or graduations on the scale 35.

In case of the wear of the end 29' of the adjustable pin 29 by constant friction with the edge of the pattern 8, so that the pointer will not indicate properly, the position of the scale 35 may be adjusted to make the pointer indicate properly by loosening the screws 37 and adjusting the base-plate 36 of the scale 35.

The operation of my improvements will be readily understood by those skilled in the art.

Supposing the adjustable pin 29 is adjusted to cut an 0 size of lens, the pointer will indicate "0," as shown in Fig. 3. If the operator desires to cut a different size of lens—for example, size 3—with the same pattern 8, he turns the adjusting-screw 34 outwardly and allows the adjustable pin 29 to move outwardly by reason of its pressure against the edge of the pattern through the operation of the tension-chain 20 on the diamond-holder frame until the pointer indicates "3." The machine will then cut a size 3 lens, and this operation may be repeated, as desired.

In lieu of the adjustable pin 29 I may use a cam 40, as shown in Fig. 8, supported on the front side of the side extension 26' and adapted to revolve on a bolt 41, secured on the front side of the side extension 26', and which may be turned in or out to tighten or loosen the cam 40. The cam 40 is of suitable shape, and its edge engages the edge of the pattern and is turned in a vertical plane to present different portions of the cam, which may be graduated or marked, as shown in Fig. 8, to move the diamond-holder frame away from or toward the center tension-pin and the center of the lens to vary the size of the lens, as desired, in the same manner as above described in connection with the adjusting-pin 29.

The advantages of my improvements will be readily appreciated by those skilled in the art. They can be readily applied to and combined with the ordinary form of lens-cutting machine now in general use, and by means thereof I am enabled to adjust the position of the diamond-holder relatively to the center tension-rod and the center of the lens without changing the coincidence of the center of the lens with the center tension-rod.

It will be understood that the details of construction of some of the parts of my improvements may be varied, if desired, and the scale or pointer may or may not be used, and any adjustable surface may be used to engage the pattern.

Having thus described my invention, what I claim as new, and desire to secure by Letters Patent, is—

1. In a lens-cutting machine, the combination with the center tension-rod, the lens pattern secured on the arbor carrying the operating-gear, and the swinging frame carrying the diamond-holder, of an adjustable surface carried on said frame, and adapted to engage the lens pattern, and to be adjusted to vary the distance of the diamond-holder from the center of the lens to be cut, and a pointer connected with and moved by said adjustable surface, and a scale for the pointer, substantially as set forth.

2. In a lens-cutting machine, the combination with the center tension-rod, the lens pattern secured on the arbor carrying the operating-gear, and the swinging frame carrying the diamond-holder, of an adjustable surface carried on said frame, and adapted to engage the lens pattern, and to be adjusted to vary the distance of the diamond-holder from the center of the lens to be cut, and a pointer connected with and moved by said adjustable surface, and an adjustable scale for the pointer, substantially as set forth.

3. In a lens-cutting machine, the combination with the swinging frame carrying the diamond-holder, of an adjustable pin carried on said frame, the inner end of which is adapted to engage the edge of the lens pattern, and said lens pattern and a screw for moving the pin toward or away from the pattern, to cause the diamond-holder to move away from or approach the center of the lens to be cut, and a pointer connected with and moved by said pin, to indicate the graduations on a scale carried on the diamond-holder frame, and said scale, substantially as set forth.

FREDERICK G. BLANCHARD.

Witnesses:
E. E. SABIN,
C. F. HILL.